United States Patent
Karasawa et al.

(10) Patent No.: US 8,981,671 B2
(45) Date of Patent: Mar. 17, 2015

(54) ILLUMINATION SYSTEM AND ILLUMINATION APPARATUS

(75) Inventors: Yosinori Karasawa, Osaka (JP); Shigeo Gotou, Osaka (JP); Kensuke Yamazoe, Osaka (JP)

(73) Assignee: Panasonic Corporation, Osaka (JP)

(*) Notice: Subject to any disclaimer, the term of this patent is extended or adjusted under 35 U.S.C. 154(b) by 177 days.

(21) Appl. No.: 13/449,597

(22) Filed: Apr. 18, 2012

(65) Prior Publication Data
US 2012/0268034 A1   Oct. 25, 2012

(30) Foreign Application Priority Data

Apr. 20, 2011   (JP) .................. 2011-093792

(51) Int. Cl.
*H05B 37/02*     (2006.01)
*F21W 131/103*   (2006.01)

(52) U.S. Cl.
CPC ........ *H05B 37/0272* (2013.01); *H05B 37/0227* (2013.01); *Y02B 20/44* (2013.01); *F21W 2131/103* (2013.01); *Y02B 20/40* (2013.01); *Y02B 20/72* (2013.01)
USPC .......................................... 315/297; 315/307

(58) Field of Classification Search
USPC ......... 315/297, 291, 307, 312, 149, 152–154, 315/158
See application file for complete search history.

(56) References Cited

U.S. PATENT DOCUMENTS

| 8,427,076 B2* | 4/2013 | Bourquin et al. ............. 315/307 |
| 8,476,834 B2* | 7/2013 | Park et al. ..................... 315/154 |
| 8,497,634 B2* | 7/2013 | Scharf ............................ 315/149 |
| 2010/0029268 A1* | 2/2010 | Myer et al. ................. 455/426.1 |

FOREIGN PATENT DOCUMENTS

| JP | H5-283173 | 10/1993 |
| JP | H10-334711 | 12/1998 |

(Continued)

OTHER PUBLICATIONS

The European Search Report dated Sep. 10, 2012.
(Continued)

*Primary Examiner* — James H Cho
(74) *Attorney, Agent, or Firm* — Bacon & Thomas, PLLC

(57) ABSTRACT

An illumination system includes a plurality of illumination apparatuses, each of the illumination apparatuses including a light source, a detection sensor for sensing presence and absence of a moving object, a wireless communication unit for transmitting a sensing signal of the detection sensor to other illumination apparatuses and for receiving a sensing signal from other illumination apparatuses and a control unit for controlling an output of the light source based on the sensing signal of the detection sensor or the sensing signal transmitted from other illumination apparatuses. If the detection sensor of one of the illumination apparatuses senses the moving object, at least one of remaining illumination apparatuses is controlled together by the sensing signal wirelessly transmitted from said one of the illumination apparatuses.

11 Claims, 9 Drawing Sheets

(56) References Cited

FOREIGN PATENT DOCUMENTS

| | | |
|---|---|---|
| JP | 2001-102182 | 4/2001 |
| JP | 2001-175994 A | 6/2001 |
| JP | 2002-305088 | 10/2002 |
| JP | 2004-241217 | 8/2004 |
| JP | 2009-54496 | 3/2009 |
| JP | 2009-110673 A | 5/2009 |
| JP | 2009-259584 A | 11/2009 |
| KR | 10-0962341 | 6/2010 |
| TW | M392908 | 11/2010 |
| WO | 2009/003279 | 1/2009 |

OTHER PUBLICATIONS

The English translation of the Chinese Office Action issued on Sep. 12, 2014 in a corresponding Chinese application No. 201210116633.X.

The European Office Action issued on Nov. 21, 2014 in a corresponding European application No. 12 002 698.4-1802.

* cited by examiner

ILLUMINATION SYSTEM AND ILLUMINATION APPARATUS

FIELD OF THE INVENTION

The present invention relates to an illumination system and an illumination apparatus.

BACKGROUND OF THE INVENTION

There is conventionally provided a road illumination system for illuminating a road (see, e.g., Paragraph [0042] and FIG. 1 of Japanese Patent Application Publication No. 2002-305088 (JP2002-305088A)). The road illumination system includes a plurality of illumination apparatuses installed along a road to light up the road, a service marker provided in a position through which a motor vehicle moving toward an illumination target region on the road can pass and a wireless tag for receiving a signal wirelessly sent from the motor vehicle passing over the service marker.

In the road illumination system, the respective illumination apparatuses are dimmed or turned off until the wireless tag receives a signal from the motor vehicle. If the wireless tag receives a signal from the motor vehicle, the respective illumination apparatuses are turned on at a specified illuminance for a specified time. With this road illumination system, it is possible to enhance safety by turning on the respective illumination apparatuses at a specified illuminance when a motor vehicle passes through. It is also possible to save energy by dimming or turning off the respective illumination apparatuses when a motor vehicle does not pass through.

The road illumination system disclosed in JP2002-305088A is capable of saving energy while enhancing safety. It is however necessary to employ a large-scale control device for controlling the illumination apparatuses. Also necessary are wiring lines for interconnecting the control device and the respective illumination apparatuses. Therefore, the cost of the illumination system as a whole grows higher.

SUMMARY OF THE INVENTION

In view of the above, the present invention provides an illumination system and an illumination apparatus capable of saving energy while securing safety and capable of suppressing an increase in cost.

In accordance with one aspect of the present invention, there is provided an illumination system includes a plurality of illumination apparatuses, each of the illumination apparatuses including a light source, a detection sensor for sensing presence and absence of a moving object, a wireless communication unit for transmitting a sensing signal of the detection sensor to other illumination apparatuses and for receiving a sensing signal from other illumination apparatuses and a control unit for controlling an output of the light source based on the sensing signal of the detection sensor or the sensing signal transmitted from other illumination apparatuses, wherein if the detection sensor of one of the illumination apparatuses senses the moving object, at least one of remaining illumination apparatuses is controlled together by the sensing signal wirelessly transmitted from said one of the illumination apparatuses.

Preferably, the light source of each of the illumination apparatuses may be capable of being continuously dimmed and capable of being momentarily turned on at a specified illuminance in response to the sensing signal of the detection sensor or the sensing signal transmitted from the remaining illumination apparatuses.

Preferably, the illumination system further includes a sensing device for sensing presence and absence of the moving object in a sensing range differing from a sensing range of the detection sensor and for wirelessly transmitting a sensing signal to at least one of the illumination apparatuses.

Preferably, each of the illumination apparatuses may be configured to, if the detection sensor senses the moving object or if the wireless communication unit receives the sensing signal, turn on the light source at a specified illuminance and may be configured to, if the detection sensor does not sense the moving object and if the wireless communication unit does not receive the sensing signal, turn on the light source at an illuminance lower than the specified illuminance or turn off the light source after a specified time lapses.

Preferably, each of the illumination apparatuses installed within a transmission range of the sensing signal of the sensing device and forward of the moving object in an advancing direction of the moving object with respect to the sensing device may be configured to, upon receiving the sensing signal, turn on the light source at a specified illuminance and may be configured to, if the moving object gets out of the sensing range of the detection sensor, turn on the light source at an illuminance lower than the specified illuminance or turn off the light source after a specified time lapses.

Preferably, the control unit of each of the illumination apparatuses may be configured to, if the detection sensor senses the moving object, find a moving direction and a moving speed of the moving object, decide a transmission content based on the moving direction and the moving speed thus found and select the illumination apparatuses to which the transmission content is to be transmitted.

Preferably, each of the illumination apparatuses may include an auxiliary light source for irradiating light in a coming direction of the moving object.

Preferably, the control unit of each of the illumination apparatuses may be configured to, if the detection sensor senses the moving object, find a moving speed of the moving object and control a lighting state of the light source based on the moving speed thus found.

Preferably, the control unit of each of the illumination apparatuses may be configured to, if the detection sensor senses the moving object, find a moving direction of the moving object and decide transmission and non-transmission of the sensing signal to other illumination apparatuses depending on the moving direction thus found.

In accordance with another aspect of the present invention, there is provided an illumination apparatus for use with other illumination apparatuses including: a light source; a detection sensor for sensing presence and absence of a moving object; a wireless communication unit for transmitting a sensing signal of the detection sensor to said other illumination apparatuses and for receiving a sensing signal from said other illumination apparatuses; and a control unit for controlling an output of the light source based on the sensing signal of the detection sensor or the sensing signal transmitted from said other illumination apparatuses, wherein the illumination apparatus is configured to, if the detection sensor senses the moving object, wirelessly transmit a sensing signal to said other illumination apparatuses and allow at least one of said other illumination apparatuses to be controlled together.

Preferably, the light source may be capable of being continuously dimmed and capable of being momentarily turned on at a specified illuminance in response to the sensing signal of the detection sensor or the sensing signal transmitted from said other illumination apparatuses.

Preferably, if the detection sensor senses the moving object or if the wireless communication unit receives the sensing signal, the light source may be turned on at a specified illuminance, if the detection sensor does not sense the moving object and if the wireless communication unit does not receive the sensing signal, the light source may be turned on at an illuminance lower than the specified illuminance or turned off the light source after a specified time lapses.

The present invention can provide an illumination system and an illumination apparatus capable of saving energy while securing safety and capable of suppressing an increase in cost.

DETAILED DESCRIPTION OF THE PREFERRED EMBODIMENTS

An embodiment of a illumination system will now be described with reference to the accompanying drawings which form a part hereof. The following description is directed to an example in which the present illumination system is applied to a road. However, the present illumination system is not limited to the present embodiment but may be applied to, e.g., a tunnel.

Figure 3:
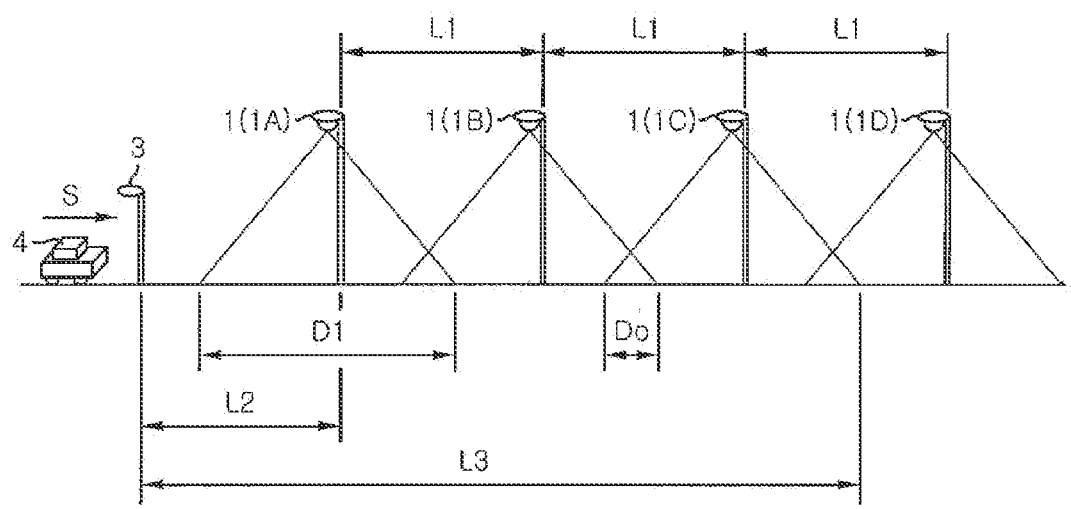
FIG. 3 is a schematic configuration view illustrating one example of the illumination system.
Figure 4A:
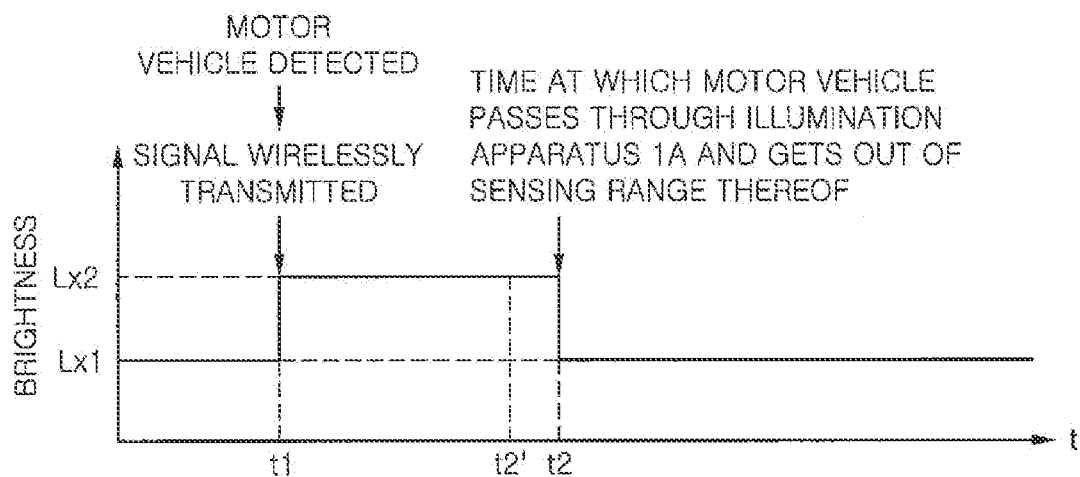
FIGS. 4A through 4D are time charts for explaining the operation of the illumination system.
Figure 4B:
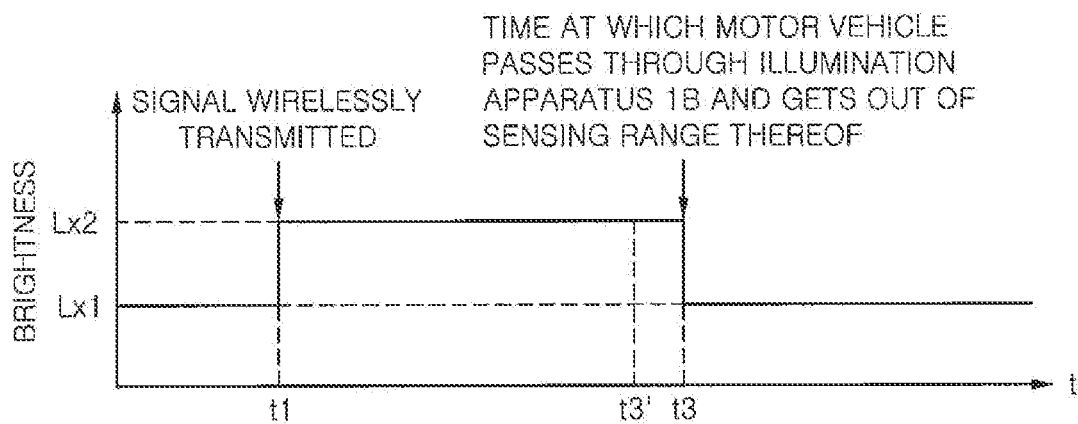
Figure 4C:
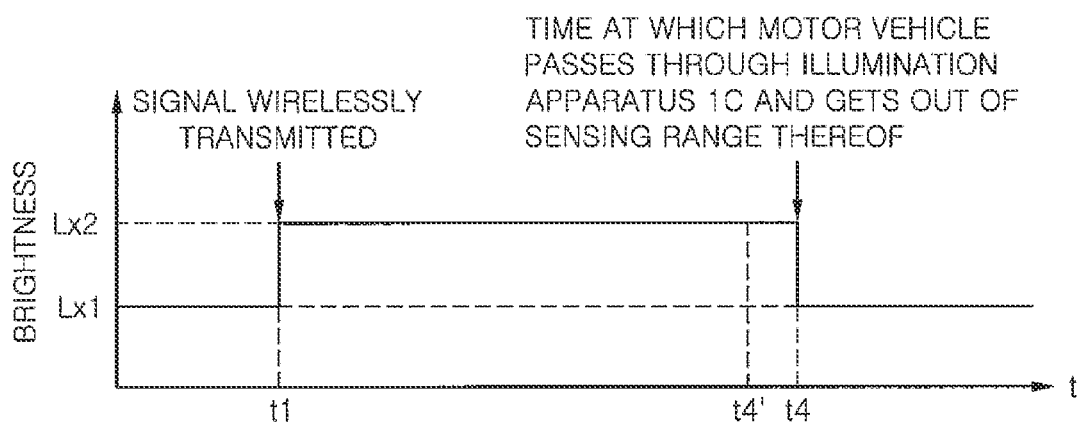
Figure 4D:
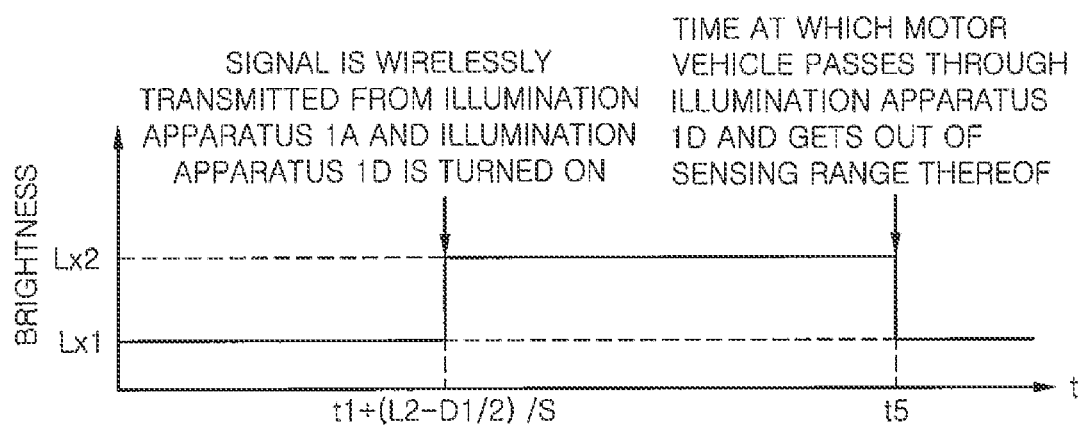

As shown in FIG. 3, the illumination system of the present embodiment includes a plurality of (four, in FIG. 3) illumination apparatuses 1 and a sensing device 3 installed ahead of the illumination apparatuses 1 to sense a moving object in a sensing range differing from the sensing range of the illumination apparatuses 1. In the following description, the illumination apparatuses 1 will be identified as illumination apparatuses 1A through 1D if such a need arises.

Figure 1A:
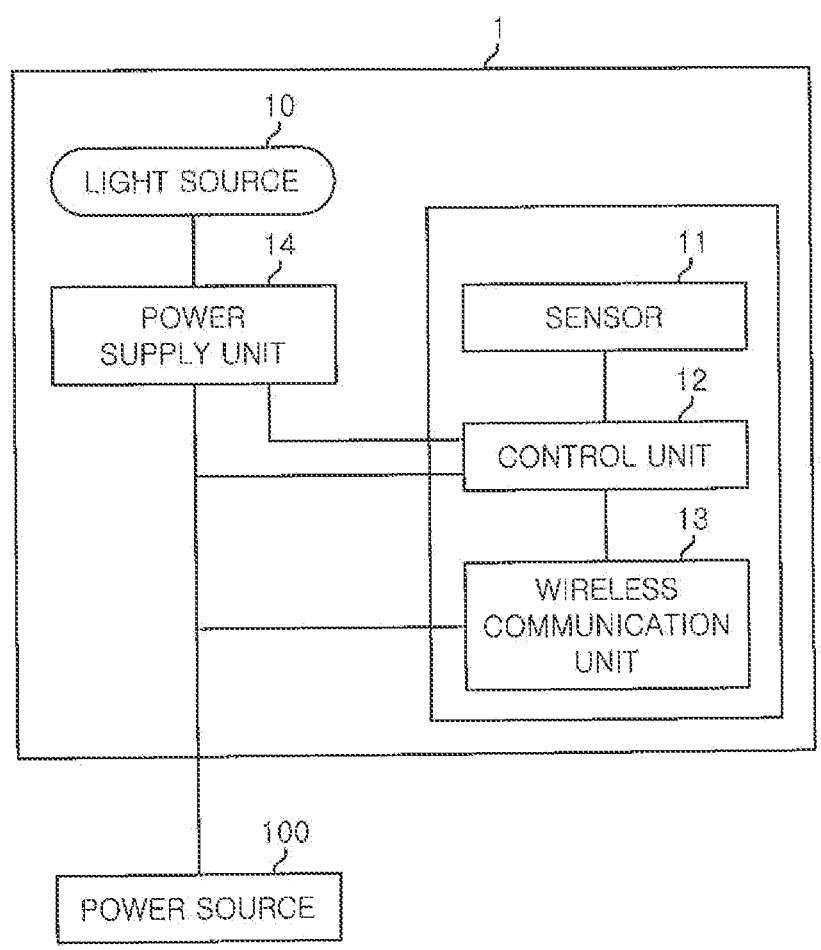
FIGS. 1A and 1B are schematic block diagrams showing one example of an illumination apparatus making up an illumination system according to one embodiment of the present invention.

As shown in FIG. 1A, each of the illumination apparatuses 1 includes, as its major components, a light source 10, a sensor (detection sensor) 11, a control unit 12, a wireless communication unit 13 and a power supply unit 14.

The light source 10 is formed of a light source capable of being continuously dimmed and capable of being momentarily turned on at a specified illuminance in response to a sensing signal sent from the sensor 11 or a sensing signal wirelessly transmitted from other illumination apparatuses 1. In the present embodiment, the light source 10 is formed of a plurality of LEDs (Light Emitting Diodes).

The sensor 11 is formed of, e.g., an electric-wave-type Doppler sensor. Upon sensing a moving object (a motor vehicle 4 in the present embodiment), the sensor 11 outputs a sensing signal to the control unit 12.

The control unit 12 is formed of, e.g., a microcomputer, and is configured to control the output of the light source 10 in response to a sensing signal sent from the sensor 11 or a sensing signal wirelessly transmitted from another illumination apparatus 1.

The wireless communication unit 13 is formed of a specific small-power wireless module and is configured to perform wireless communication with other illumination apparatuses 1.

The power supply unit 14 is formed of a chopper circuit for converting a source voltage of a power source 100 to a direct current voltage having a desired voltage value. The power supply unit 14 is designed to supply an illumination power to the light source 10 in response to a control signal sent from the control unit 12. Operation power is supplied from the power source 100 to the control unit 12 and the wireless communication unit 13.

If the sensor 11 senses a moving object, the control unit 12 finds the moving direction of the moving object and decides the illumination apparatuses 1 to which the sensing signal is transmitted depending on the moving direction thus found. More specifically, the moving direction and the address allotted to each of the illumination apparatuses 1 are stored in a storage unit (not shown) in a corresponding relationship with each other. The control unit 12 reads out the corresponding addresses from the storage unit depending on the moving direction. Then, the control unit 12 prepares a transmission signal containing the read-out addresses and the sensing signal and transmits the transmission signal through the wireless communication unit 13.

On the other hand, each of the illumination apparatuses 1 receiving the transmission signal compares its own address with the addresses contained in the transmission signal. If matched, each of the illumination apparatuses 1 takes the sensing signal contained in the transmission signal and performs the turning-on control of the light source 10. If not matched, each of the illumination apparatuses 1 discards the transmission signal.

Figure 1B:
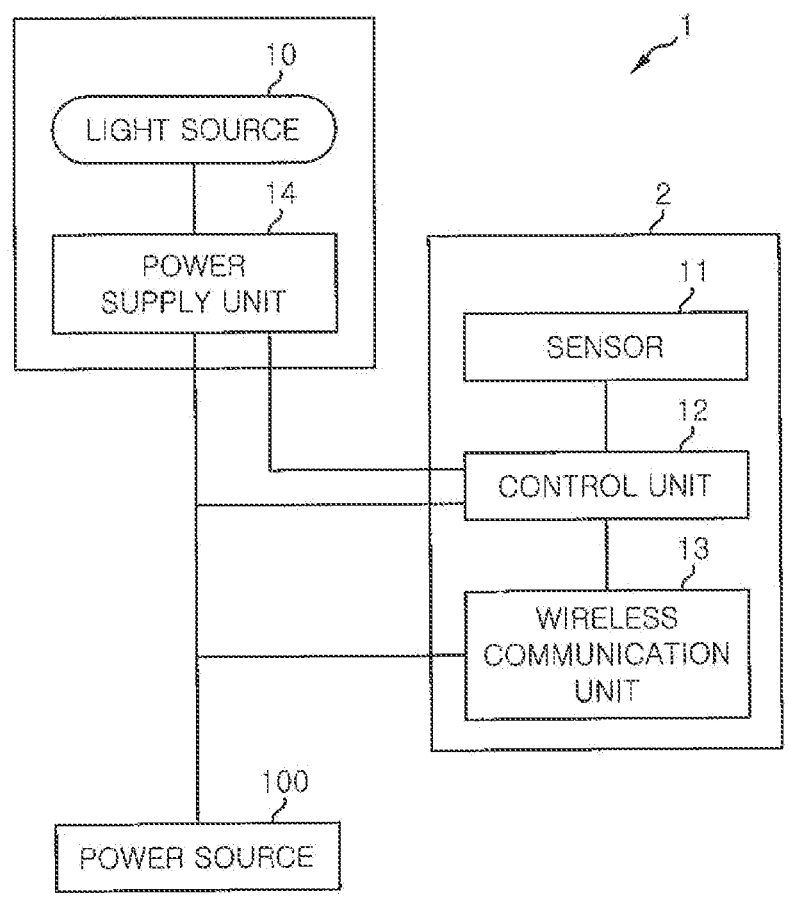

FIG. 1A shows an example in which the light source 10, the sensor 11, the control unit 12, the wireless communication unit 13 and the power supply unit 14 are provided within a single housing. Alternatively, as shown in FIG. 1B, the sensor 11, the control unit 12 and the wireless communication unit 13 may be independently provided as an additional apparatus 2.

Although not shown in the drawings, the sensing device 3 includes, as its major components, an electric-wave-type Doppler sensor, a wireless communication unit for wirelessly transmitting the sensing signal of the Doppler sensor and a control unit for controlling the operation of the wireless communication unit. If a moving object is sensed by the Doppler sensor, the wireless communication unit transmits a sensing signal to the respective illumination apparatuses 1.

Figure 2:
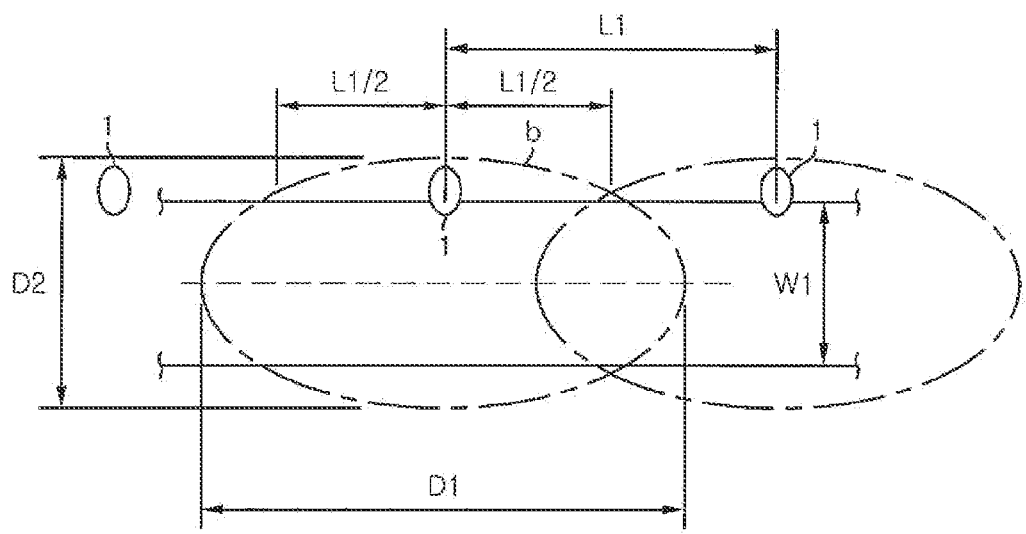
FIG. 2 is a schematic view depicting a sensing range of a sensor employed in the illumination apparatus.

FIG. 2 is a schematic view illustrating the sensing range of the sensor 11 provided in each of the illumination apparatuses 1. The respective illumination apparatuses 1 are installed along one side of a road. In FIG. 2, L1 denotes the installation interval of the illumination apparatuses 1 adjoining to each other. W1 denotes the width of a road. D1 denotes the major diameter of an elliptical sensing range b of the sensor 11. D2 denotes the minor diameter of the elliptical sensing range b of the sensor 11. Accordingly, it is preferable to satisfy the inequality $D1 \geq L1$ and $D2 \geq W1$ in order to prevent sensing failure of the sensor 11 of each of the illumination apparatuses 1.

FIG. 3 is a schematic configuration view showing one example of the illumination system according to the present embodiment. In FIG. 3, L1 denotes the installation interval of the illumination apparatuses 1 adjoining to each other. D1 denotes the sensing range of the sensor 11 in the moving direction of the motor vehicle 4. Do denotes the overlapped sensing range. In FIG. 3, L2 denotes the distance from the motor vehicle 4 to the illumination apparatus 1A when the motor vehicle 4 is first sensed by the sensing device 3 (In FIG. 3, for the sake of convenience in description, the sensing range of the sensing device 3 is shown to be negligibly small in the longitudinal direction of the road). L3 denotes the maximum transmission distance of the sensing signal transmitted from the sensing device 3. S denotes the speed of the motor vehicle 4. In this regard, the transmission distance L3 is, e.g., from 100 m to 150 m. D1 and L3 are set to satisfy an inequality L2+2×L1≤L3<L2+3×L1.

Next, the operation of the present illumination system will be described with reference to FIG. 3 and FIGS. 4A through 4D. FIGS. 4A to 4D are time charts of the illumination apparatuses 1A to 1D, respectively. In FIGS. 4A through 4D, t2 through t5 denote the time required for the motor vehicle 4 to pass through the respective illumination apparatuses 1A through 1D and to get out of the sensing range of the respective sensors 11.

Prior to time t1 at which the sensing device 3 senses the motor vehicle 4, all the control units 12 of the illumination apparatuses 1A through 1D keep the light sources 10 turned on in a dimmed condition at a low illuminance Lx1. If the sensing device 3 senses the motor vehicle 4, a sensing signal is transmitted from the sensing device 3 to the illumination apparatuses 1A through 1C existing within the range of the transmission distance L3 of the sensing signal of the sensing device 3. Then in the illumination apparatuses 1A through 1C, the control units 12 control the light sources 10 turned on at a high illuminance LX2 higher than the low illuminance Lx1(LX2>Lx1). Since the illumination apparatus 1D exists outside the transmission range of the sensing signal of the sensing device 3, the light source 10 thereof is kept turned on in a dimmed condition at a low illuminance Lx1.

If the motor vehicle 4 gets into the sensing range D1 of the sensor 11 of the illumination apparatus 1A, the control unit 12 of the illumination apparatus 1A causes the wireless communication unit 13 thereof to transmit the sensing signal to the illumination apparatuses 1B through 1D. Upon receiving the sensing signal, the control units 12 of the illumination apparatuses 18 and 10 keep the light sources 10 turned on. Upon receiving the sensing signal, the control unit 12 of the illumination apparatus 1D turns on the light source 10 at the high illuminance LX2. The time at this moment is the time at which the motor vehicle 4 gets into the sensing range D1 of the sensor 11 of the illumination apparatus 1A and is represented by an equation t1+(L2−D1/2)/S.

If the motor vehicle 4 gets into the sensing range of the sensor 11 of the illumination apparatus 1B at time t2', the control unit 12 of the illumination apparatus 1B causes the wireless communication unit 13 thereof to transmit the sensing signal to the illumination apparatuses 10 through 1D. Upon receiving the sensing signal, the control units 12 of the illumination apparatuses 1C and 1D keep the light sources 10 turned on. If the motor vehicle 4 gets out of the sensing range D1 of the sensor 11 of the illumination apparatus 1A at time t2, the control unit 12 of the illumination apparatus 1A turns on the light source 10 in a dimmed condition at a low illuminance Lx1.

If the motor vehicle 4 gets into the sensing range of the sensor 11 of the illumination apparatus 1C at time t3', the control unit 12 of the illumination apparatus 1C causes the wireless communication unit 13 thereof to transmit the sensing signal to the illumination apparatus 1D. Upon receiving the sensing signal, the control unit 12 of the illumination apparatus 1D keeps the light sources 10 turned on. If the motor vehicle 4 gets out of the sensing range D1 of the sensor 11 of the illumination apparatus 1B at time t3, the control unit 12 of the illumination apparatus 1B turns on the light source 10 in a dimmed condition at the low illuminance Lx1.

If the motor vehicle 4 gets out of the sensing range D1 of the sensor 11 of the illumination apparatus 1C at time t4, the control unit 12 of the illumination apparatus 1C turns on the light source 10 in a dimmed condition at a low illuminance Lx1.

If the motor vehicle 4 gets out of the sensing range D1 of the sensor 11 of the illumination apparatus 1D at time t5, the control unit 12 of the illumination apparatus 1D turns on the light source 10 in a dimmed condition at a low illuminance Lx1. At this time, all the light sources 10 of the illumination apparatuses 1A through 1D are kept turned on in a dimmed condition at a low illuminance Lx1.

Time t2 through t5 stated above can be calculated as follows: t2=(L2+D1/2)/S; t3=(L1+L2+D1/2)S; t4=(2×L1+L2+D1/2)/S; and t5=(3×L1+L2+D1/2)/S.

Figure 5:
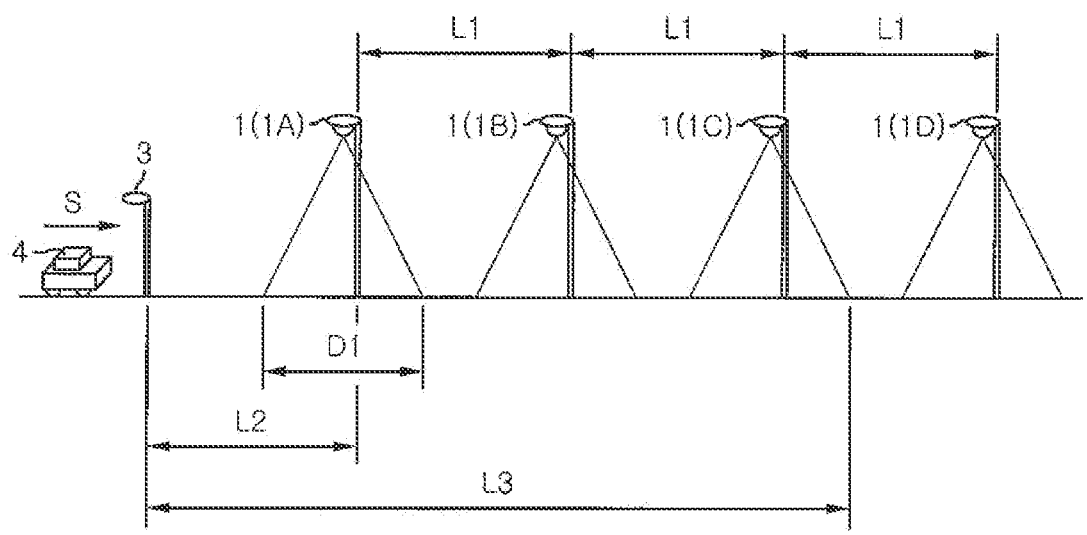
FIG. 5 is a schematic configuration view illustrating another example of the illumination system.
Figure 6A:
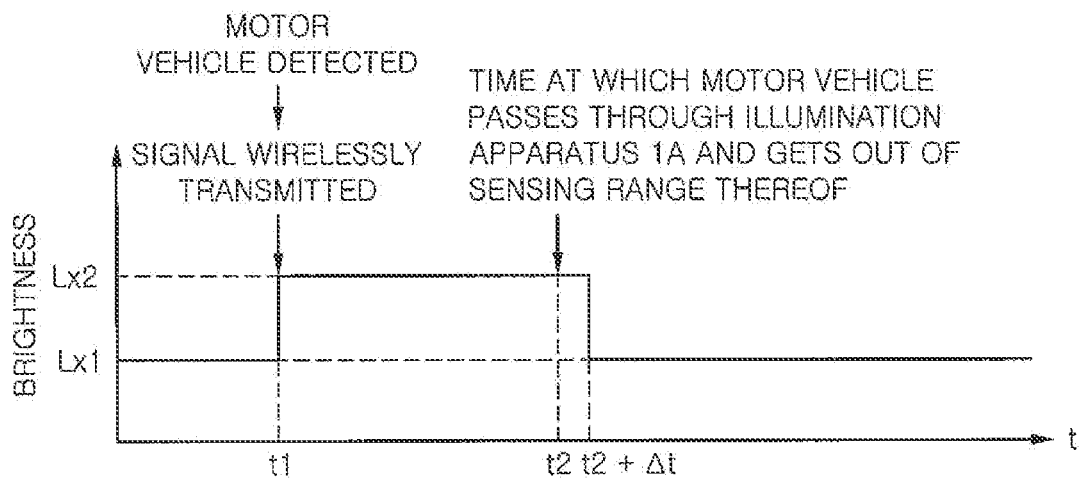
FIGS. 6A through 6D are time charts for explaining the operation of the illumination system.
Figure 6B:
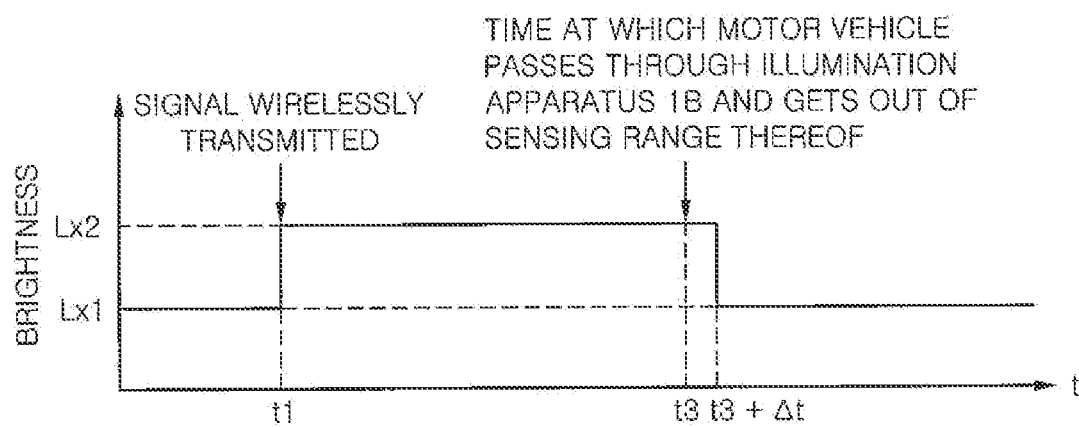
Figure 6C:
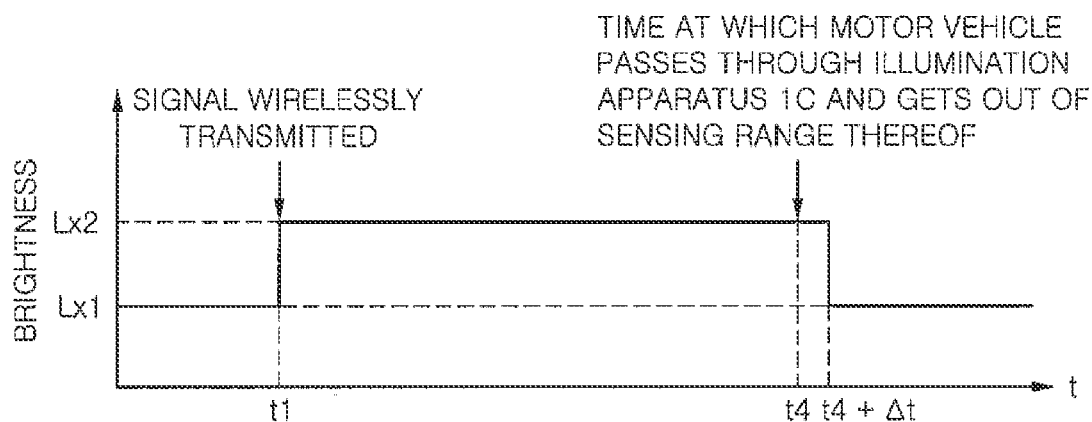
Figure 6D:
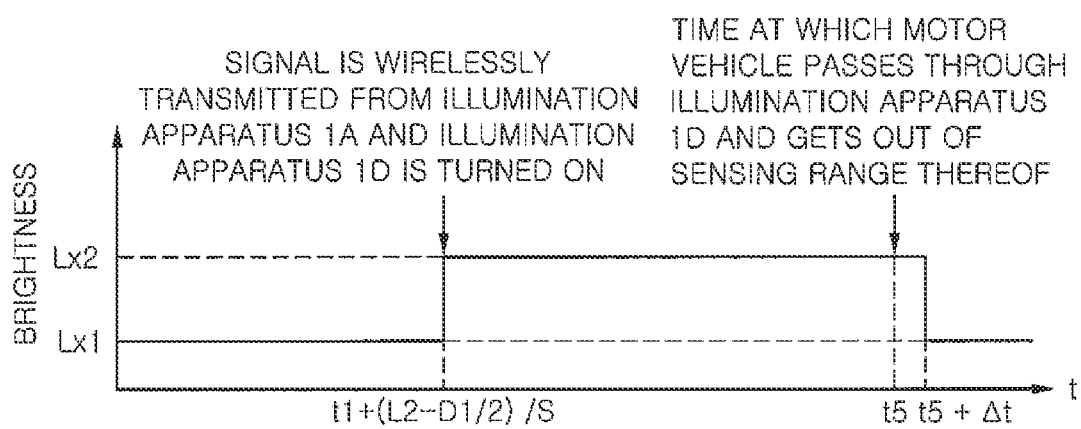

FIG. 5 is a schematic configuration view showing another example of the illumination system according to the present embodiment. Although the sensing ranges D1 of the adjacent illumination apparatuses are overlapped in the above example, the present example shows the case where the sensing ranges D1 are not overlapped. In FIG. 5, L1 denotes the installation interval of the illumination apparatuses 1 adjoining to each other. D1 denotes the sensing range of the sensor 11 in the moving direction of the motor vehicle 4. In FIG. 5, L2 denotes the distance from the motor vehicle 4 to the illumination apparatus 1A when the motor vehicle 4 is first sensed by the sensing device 3 (In FIG. 5, for the sake of convenience in description, the sensing range of the sensing device 3 is shown to be negligibly small in the longitudinal direction of the road). L3 denotes the maximum transmission distance of the sensing signal transmitted from the sensing device 3. S denotes the speed of the motor vehicle 4. In this regard, the transmission distance L3 is, e.g., from 100 m to 150 m. D1 and L3 are set to satisfy an inequality L2+2×L1≤L3<L2+3×L1.

Next, the operation of the present illumination system will be described with reference to FIG. 5 and FIGS. 6A through 6D. FIGS. 6A through 6D are time charts of the illumination apparatuses 1A through 1D, respectively. In FIGS. 6A through 6D, t2 through t5 denote the time required for the motor vehicle 4 to pass through the respective illumination apparatuses 1A through 1D and to get out of the sensing range of the respective sensors 11. In FIGS. 6A through 6D, Δt denotes the turning-on holding time of the light source 10 after the motor vehicle 4 gets out of the sensing range D1 of the sensor 11. In the present embodiment, the turning-on holding time is set longer than the time taken for the motor vehicle 4 to get out of the sensing range D1 of the previous sensor 11 and to get into the sensing range D1 of the next sensor 11.

Prior to time t1 at which the sensing device 3 senses the motor vehicle 4, all the control units 12 of the illumination apparatuses 1A through 1D keep the light sources 10 turned on in a dimmed condition at a low illuminance Lx1. If the sensing device 3 senses the motor vehicle 4, a sensing signal is transmitted from the sensing device 3. In the illumination apparatuses 1A through 1C existing within the range of the transmission distance L3 of the sensing signal of the sensing device 3, the control units 12 keep the light sources 10 turned on at a high illuminance Lx2 higher than the low illuminance Lx1(Lx2>Lx1). Since the illumination apparatus 1D exists outside the transmission range of the sensing signal of the sensing device 3, the light source 10 thereof is kept turned on in a dimmed condition at a low illuminance Lx1.

If the motor vehicle 4 gets out of the sensing range of the sensing device 3, the control units 12 of the respective illumination apparatuses 1A through 10 begin to count the turning-on holding time Δt. However, the motor vehicle 4 gets into the sensing range D1 of the sensor 11 of the illumination apparatus 1A before the counting of the turning-on holding time Δt comes to an end. For that reason, the control unit 12 of the illumination apparatus 1A stops counting the turning-on holding time Δt and keeps the light source 10 turned on. In addition, the control unit 12 of the illumination apparatus 1A causes the wireless communication unit 13 thereof to transmit the sensing signal to the illumination apparatuses 1B through 1D. Upon receiving the sensing signal, the control units 12 of the illumination apparatuses 1B and 10 stop counting the turning-on holding time Δt and keep the light sources 10 turned on. Upon receiving the sensing signal, the control unit 12 of the illumination apparatus 1D turns on the light source 10 at a high illuminance Lx2. The time at this moment is the time at which the motor vehicle 4 gets into the sensing range D1 of the sensor 11 of the illumination apparatus 1A and is represented by an equation t1+(L2−D1/2)/S.

If the motor vehicle 4 gets out of the sensing range D1 of the sensor 11 of the illumination apparatus 1A at time t2, the control units 12 of the respective illumination apparatuses 1A through 1D begin to count the turning-on holding time Δt. However, the motor vehicle 4 gets into the sensing range of the sensor 11 of the illumination apparatus 1B before the counting of the turning-on holding time Δt comes to an end. For that reason, the control unit 12 of the illumination apparatus 1B stops counting the turning-on holding time Δt and keeps the light source 10 turned on. In addition, the control unit 12 of the illumination apparatus 1B causes the wireless communication unit 13 thereof to transmit the sensing signal to the illumination apparatuses 1C and 1D. Upon receiving the sensing signal, the control units 12 of the illumination apparatuses 1C and 1D stop counting the turning-on holding time Δt and keep the light sources 10 turned on. The illumination apparatus 1A existing ahead of the illumination apparatus 1B cannot receive the sensing signal. Therefore, at time t2+Δt at which the turning-on holding time Δt lapses, the control unit 12 of the illumination apparatus 1A turns on the light source 10 in a dimmed condition at a low illuminance Lx1.

If the motor vehicle 4 gets out of the sensing range D1 of the sensor 11 of the illumination apparatus 1B at time t3, the control units 12 of the respective illumination apparatuses 1B through 1D begin to count the turning-on holding time Δt. However, the motor vehicle 4 gets into the sensing range of the sensor 11 of the illumination apparatus 1C before the counting of the turning-on holding time Δt comes to an end. For that reason, the control unit 12 of the illumination apparatus 1C stops counting the turning-on holding time Δt and keeps the light source 10 turned on. In addition, the control unit 12 of the illumination apparatus 1C causes the wireless communication unit 13 thereof to transmit the sensing signal to the illumination apparatus 1D. Upon receiving the sensing signal, the control unit 12 of the illumination apparatus 1D stops counting the turning-on holding time Δt and keeps the light sources 10 turned on. At this time, the illumination apparatuses 1A and 1B existing ahead of the illumination apparatus 1C cannot receive the sensing signal. Therefore, at time t3+Δt at which the turning-on holding time Δt lapses, the control unit 12 of the illumination apparatus 1B turns on the light source 10 in a dimmed condition at a low illuminance Lx1.

If the motor vehicle 4 gets out of the sensing range D1 of the sensor 11 of the illumination apparatus 1C at time t4, the control units 12 of the respective illumination apparatuses 1C and 1D begin to count the turning-on holding time Δt. However, the motor vehicle 4 gets into the sensing range of the sensor 11 of the illumination apparatus 1D before the counting of the turning-on holding time Δt comes to an end. For that reason, the control unit 12 of the illumination apparatus 1D stops counting the turning-on holding time Δt and keeps the light source 10 turned on. At this time, the illumination apparatuses 1A through 1C existing ahead of the illumination apparatus 1D cannot receive the sensing signal. Therefore, at time t4+Δt at which the turning-on holding time Δt lapses, the control unit 12 of the illumination apparatus 1C turns on the light source 10 in a dimmed condition at a low illuminance Lx1.

If the motor vehicle 4 gets out of the sensing range D1 of the sensor 11 of the illumination apparatus 1D at time t5, the control unit 12 of the illumination apparatus 1D begins to count the turning-on holding time Δt. As the counting of the turning-on holding time Δt comes to an end, the control unit 12 of the illumination apparatus 1D turns on the light source 10 in a dimmed condition at a low illuminance Lx1. At this time, all the light sources 10 of the illumination apparatuses 1A through 1D are kept turned on in a dimmed condition at a low illuminance Lx1.

Time t2 through t5 stated above can be calculated as follows: t2=(L2+D1/2)/S; t3=(L1+L2+D1/2)S; t4=(2×L1+L2+D1/2)/S; and t5=(3×L1+L2+D1/2)/S.

While the illumination conditions of the illumination apparatuses 1 are controlled in response to the moving direction of the motor vehicle 4 in the embodiment described above, the illumination conditions of the illumination apparatuses 1 may be controlled based on the moving speed of a moving object. For example, if the present illumination system is installed in an intersection, the control units 12 of the illumination apparatuses 1 distinguish a low-speed object such as a human or a bicycle from a high-speed object such as a motor vehicle or the like. If the moving object sensed by the sensor 11 is a low-speed object, the control units 12 increase the illuminance of the light sources 10 and cause the illumination apparatuses 1 to broadly illuminate the area including a pedestrian staying place and a pedestrian crossing. On the other hand, if the moving object sensed by the sensor 11 is a high-speed object, the illumination apparatuses 1 are kept in a dimmed condition without having to change the illuminance of the light sources 10. By turning on the light sources 10 at a high illuminance when the moving object is a low-speed object, it becomes possible to easily recognize a human or a bicycle existing in a pedestrian staying place or moving across a pedestrian crossing. The light sources 10 are kept in a dimmed condition when a moving object is not sensed or if the moving object is a high-speed object. This makes it possible to save energy.

In the present embodiment, the sensing range of the sensor 11 needs to be set to cover a portion of a walkway or a pedestrian staying place. The moving speed of a pedestrian is approximately from 4 km/h to 5 km/h and the moving speed of a bicycle is approximately from 20 km/h to 25 km/h. In light of this, it is preferred that a reference speed for determination of a high-speed object and a low-speed object be set equal to about 30 km/h.

Figure 7A:
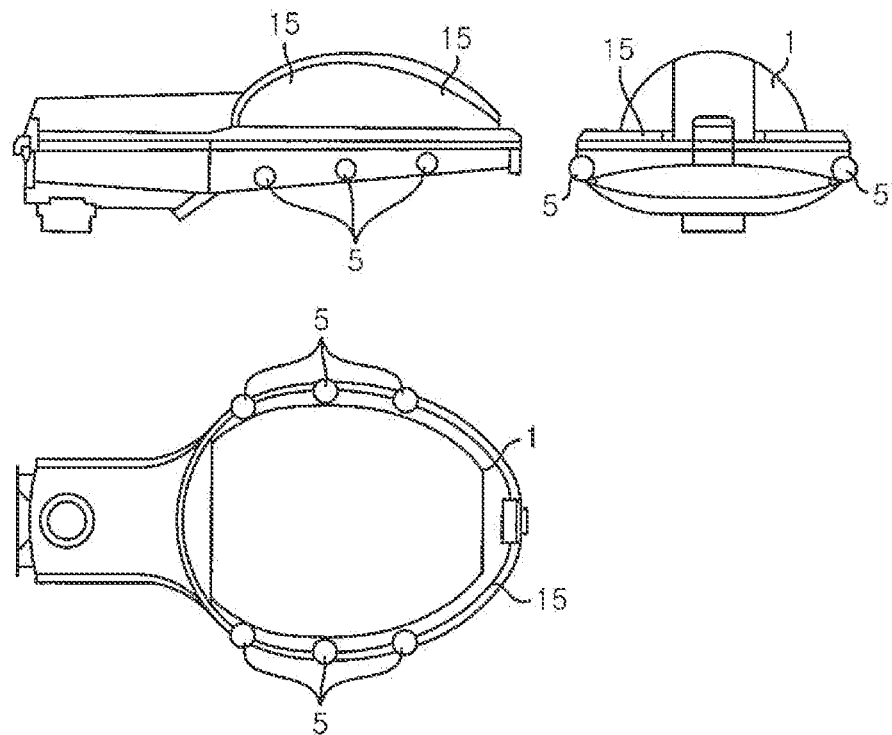
FIGS. 7A and 7B are external appearance views showing other examples of the illumination apparatus making up the illumination system.
Figure 7B:
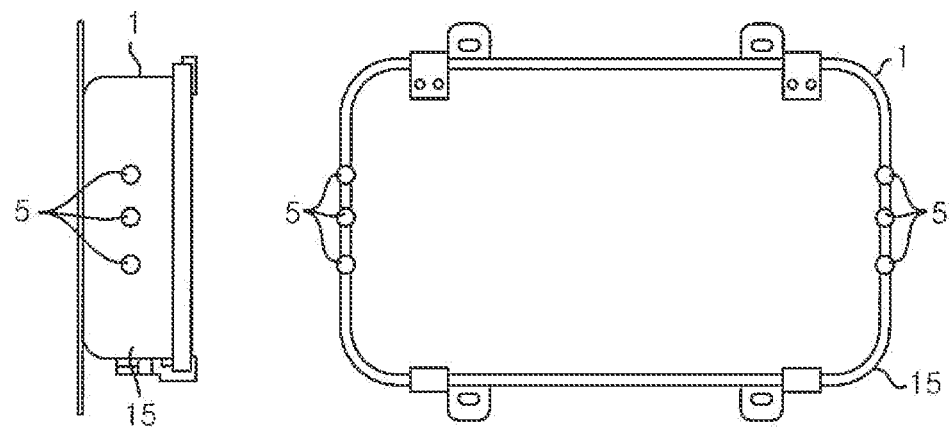

FIGS. 7A and 7B are external appearance views showing other examples of the illumination apparatuses 1 employed in the present embodiment. FIG. 7A shows a road lamp and FIG. 7B shows a tunnel lamp. Each of the illumination apparatuses 1 includes a plurality of (three at each side in FIGS. 7A and 7B) auxiliary light sources (e.g., light emitting diodes) 5 for irradiating light in the lateral direction of a device body 15 (in the coming direction of the motor vehicle 4 when installed in place, e.g., in the left-right direction in FIG. 3). In this regard, the light sources 10 are kept in a dimmed condition when the motor vehicle 4 gets out of the sensing range of the sensor 11. For that reason, there is a possibility that an optical guide effect provided by the illumination apparatuses 1 glittering when seen from a distant place may be lost. In the examples shown in FIGS. 7A and 7B, however, it is possible to maintain the optical guide effect through the use of the light irradiated from the auxiliary light sources 5 provided in each of the illumination apparatuses 1.

With the present embodiment, it is possible to secure safety by turning on the light sources 10 at a high illuminance Lx2 when the motor vehicle 4 is sensed by the sensor 11. It is also possible to save energy by turning on the light sources 10 in a dimmed condition at a low illuminance Lx1 when the motor vehicle 4 is not sensed by the sensor 11 and a specified time period is lapsed thereafter. Since wireless communication is performed between the respective illumination apparatuses 1, the wiring lines for interconnecting the respective illumination apparatuses 1 become unnecessary. As a consequence, it is possible to restrain an increase in cost as compared with the prior art example.

In case where LEDs are used as the light sources 10 as in the present embodiment, it is possible to momentarily turn on the light sources 10 upon sensing the motor vehicle 4. Accordingly, even if the moving object is a fast moving object such as a motor vehicle 4 or the like, it is possible to reliably turn on the light sources 10 at the time of passage of the motor vehicle 4. In case of using the sensing device 3 as in the present embodiment, the sensing device 3 is installed ahead of the illumination apparatuses 1. Consequently, even if the moving object is a fast moving object such as a motor vehicle 4 or the like, it is possible to reliably turn on the light sources 10 at the time of passage of the motor vehicle 4.

In the present embodiment, the illumination control can be performed depending on the kinds of moving objects by finding the moving speed of the moving objects. In addition, by finding the moving direction of the moving objects, it is possible to turn on the light sources 10 at a high illuminance Lx2 in the moving direction of the moving objects, thereby securing a wide enough illumination range. In the area behind the moving objects, the light sources 10 are turned on in a dimmed condition at a low illuminance Lx1. This makes it possible to save energy.

In the present embodiment, the provision of the sensing device 3 has been described by way of example. As an alternative example, the illumination system may be formed of only the illumination apparatuses 1. The number of the illumination apparatuses 1 is nothing more than one example and may be set differently, if plural. In the present embodiment, the light sources 10 are formed of LEDs. Alternatively, the light sources 10 may be formed of other light sources capable of being continuously dimmed and capable of being momentarily turned on at a specified illuminance.

The moving object is not limited to the motor vehicle 4 but may be a human, a bicycle or other moving bodies. In the present embodiment, the light sources 10 are turned on in a dimmed condition at a low illuminance Lx1 when the motor vehicle 4 is not sensed by the sensor 11 or the sensing device 3. Alternatively, the light sources 10 may be turned off, in which case it becomes possible to further save energy. The transmission distance L3 of the sensing signal of the sensing device 3, the sensing range D1 of the sensor 11 and the installation interval L1 of the respective illumination apparatuses 1 are nothing more than one example and may be arbitrarily set depending on the installation environment and so forth. In the present embodiment, the illumination conditions of the illumination apparatuses 1 are controlled in response to one of the moving direction and speed of the moving objects. Alternatively, the illumination conditions of the illumination apparatuses 1 may be controlled based on both of the moving direction and speed of the moving objects.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An illumination system, comprising:
a plurality of illumination apparatuses, each of the illumination apparatuses including a light source, a detection sensor for sensing presence and absence of a moving object, a wireless communication unit for transmitting a sensing signal of the detection sensor to other illumination apparatuses and for receiving a sensing signal from other illumination apparatuses and a control unit for controlling an output of the light source based on the sensing signal of the detection sensor or the sensing signal transmitted from other illumination apparatuses,
wherein if the detection sensor of one of the illumination apparatuses senses the moving object, at least one of remaining illumination apparatuses is controlled together by the sensing signal wirelessly transmitted from said one of the illumination apparatuses,
wherein the control unit of one of the illumination apparatuses controls the light source of said one of the illumination apparatuses so that an illuminance of the light source of said one of the illumination apparatuses when said one of the illumination apparatuses is in an area forward of the moving object in a moving direction of the moving object and an illuminance of the light source of said one of the illumination apparatuses when said one of the illumination apparatuses is in an area behind the moving object in the moving direction are different each other, and
wherein the illumination system further comprises a sensing device for sensing presence and absence of the moving object in a sensing range differing from a sensing range of the detection sensor and for wirelessly transmitting a sensing signal to at least one of the illumination apparatuses.

2. The system of claim 1, wherein the light source of each of the illumination apparatuses is capable of being continuously dimmed and capable of being momentarily turned on at a specified illuminance in response to the sensing signal of the detection sensor or the sensing signal transmitted from the remaining illumination apparatuses.

3. The system of claim 1, wherein each of the illumination apparatuses is configured to, if the detection sensor senses the moving object or if the wireless communication unit receives the sensing signal, turn on the light source at a specified illuminance and is configured to, if the detection sensor does not sense the moving object and if the wireless communication unit does not receive the sensing signal, turn on the light source at an illuminance lower than the specified illuminance or turn off the light source after a specified time lapses.

4. The system of claim 1, wherein each of the illumination apparatuses installed within a transmission range of the sensing signal of the sensing device and forward of the moving object in an advancing direction of the moving object with respect to the sensing device is configured to, upon receiving the sensing signal, turn on the light source at a specified illuminance and is configured to, if the moving object gets out of the sensing range of the detection sensor, turn on the light source at an illuminance lower than the specified illuminance or turn off the light source after a specified time lapses.

5. The system of claim 1, wherein the control unit of each of the illumination apparatuses is configured to, if the detection sensor senses the moving object, find the moving direction and a moving speed of the moving object, decide a transmission content based on the moving direction and the moving speed thus found and select the illumination apparatuses to which the transmission content is to be transmitted.

6. The system of claim 1, wherein the control unit of each of the illumination apparatuses is configured to, if the detection sensor senses the moving object, find a moving speed of the moving object and control a lighting state of the light source based on the moving speed thus found.

7. The system of claim 1, wherein the control unit of each of the illumination apparatuses is configured to, if the detection sensor senses the moving object, find the moving direction of the moving object and decide transmission and non-transmission of the sensing signal to other illumination apparatuses depending on the moving direction thus found.

8. An illumination system, comprising:
a plurality of illumination apparatuses, each of the illumination apparatuses including a light source, a detection sensor for sensing presence and absence of a moving object, a wireless communication unit for transmitting a sensing signal of the detection sensor to other illumination apparatuses and for receiving a sensing signal from other illumination apparatuses and a control unit for controlling an output of the light source based on the sensing signal of the detection sensor or the sensing signal transmitted from other illumination apparatuses,
wherein if the detection sensor of one of the illumination apparatuses senses the moving object, at least one of remaining illumination apparatuses is controlled together by the sensing signal wirelessly transmitted from said one of the illumination apparatuses,
wherein the control unit of one of the illumination apparatuses controls the light source of said one of the illumination apparatuses so that an illuminance of the light source of said one of the illumination apparatuses when said one of the illumination apparatuses is in an area forward of the moving object in a moving direction of the moving object and an illuminance of the light source of said one of the illumination apparatuses when said one of the illumination apparatuses is in an area behind the moving object in the moving direction are different each other, and
wherein each of the illumination apparatuses includes an auxiliary light source for irradiating light in a coming direction of the moving object.

9. An illumination apparatus for use with other illumination apparatuses, comprising:
a light source;
a detection sensor for sensing presence and absence of a moving object;
a wireless communication unit for transmitting a sensing signal of the detection sensor to said other illumination apparatuses and for receiving a sensing signal from said other illumination apparatuses; and
a control unit for controlling an output of the light source based on the sensing signal of the detection sensor or the sensing signal transmitted from said other illumination apparatuses,
wherein the illumination apparatus is configured to, if the detection sensor senses the moving object, wirelessly transmit a sensing signal to said other illumination apparatuses and allow at least one of said other illumination apparatuses to be controlled together,
wherein the control unit controls the light source so that an illuminance of the light source when the illumination apparatus is in an area forward of the moving object in a moving direction of the moving object and an illuminance of the light source when the illumination apparatus is in an area behind the moving object in the moving direction are different each other, and
wherein the illumination apparatus includes an auxiliary light source for irradiating light in a coming direction of the moving object.

10. The apparatus of claim 9, wherein the light source is capable of being continuously dimmed and capable of being momentarily turned on at a specified illuminance in response to the sensing signal of the detection sensor or the sensing signal transmitted from said other illumination apparatuses.

11. The apparatus of claim 9, wherein if the detection sensor senses the moving object or if the wireless communication unit receives the sensing signal, the light source is turned on at a specified illuminance, if the detection sensor does not sense the moving object and if the wireless communication unit does not receive the sensing signal, the light source is turned on at an illuminance lower than the specified illuminance or turned off the light source after a specified time lapses.

* * * * *